2,773,711
Patented Dec. 11, 1956

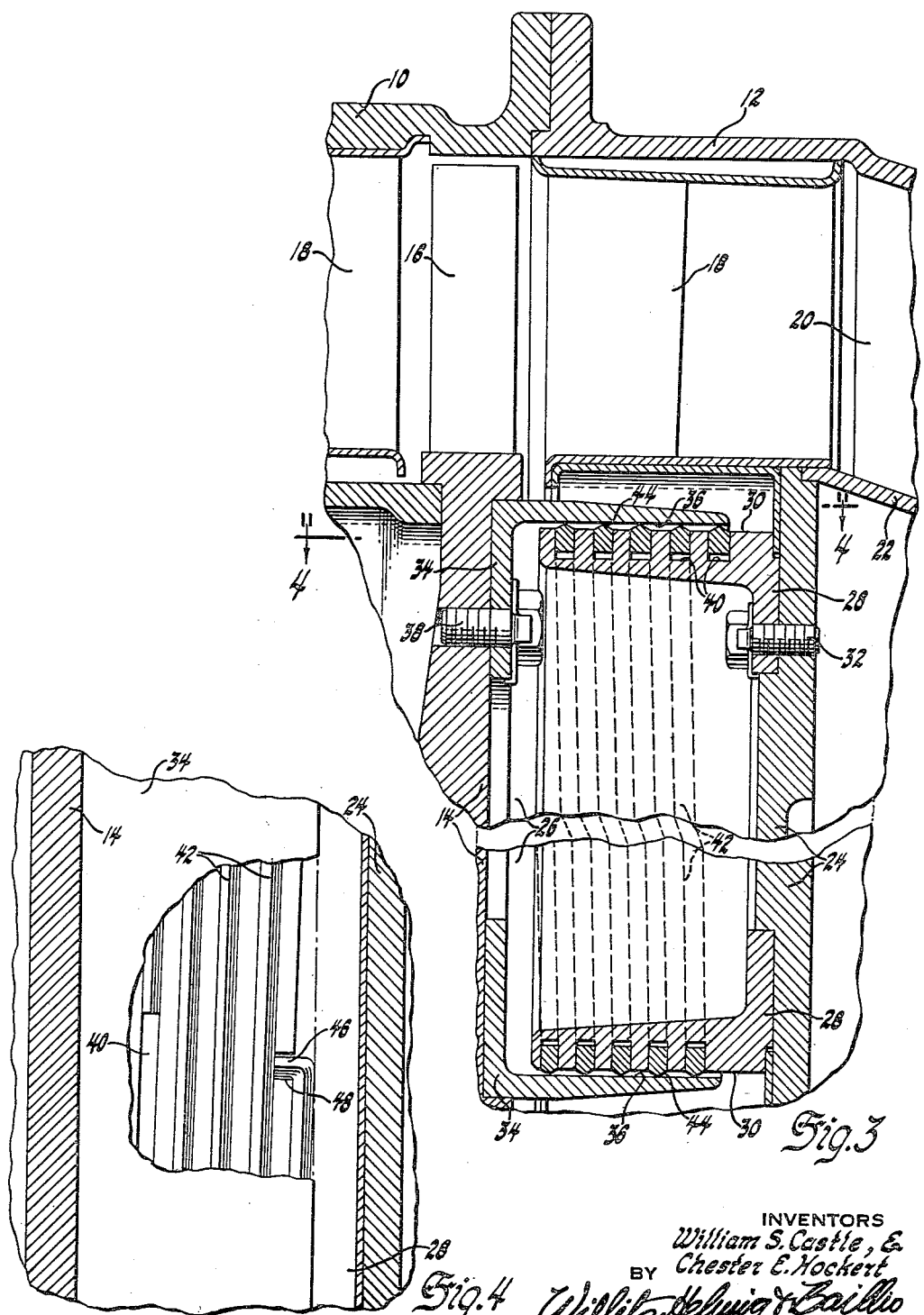

2,773,711

COIL SPRING FLUID PRESSURE SEAL

William S. Castle, Speedway, and Chester E. Hockert, Indianapolis, Ind., assignors to General Motors Corporation, Detroit, Mich., a corporation of Delaware Application February 20, 1953, Serial No. 338,028

4 Claims. (Cl. 286—10)

This invention relates to fluid pressure seals, and more particularly, to gas seals for turbomachines and the like.

Considerable difficulty has been experienced with turbomachines having large diameter rotors in providing gas seals that will inhibit gas leakage from the pressurized fluid flow path of the turbomachine to the atmosphere. Gas seals heretofore known may be generally classified in three categories; namely, sliding contact seals, labyrinth seals, and liquid seals, and none of these types of seals has been entirely satisfactory. Leakage through sliding contact seals can be decreased only by increasing the force with which they engage the relatively rotating member, and this gives rise to considerable friction at high speeds which is objectionable inasmuch as lubrication of the seal is not feasible. Labyrinth seals of the radial type require the maintenance of a close concentricity between the rotor and stator, while labyrinth seals of the axial type require the maintenance of a close axial adjustment between the rotor and stator; and both types require a great number of stages where high pressure differentials are involved. The liquid seal tends to be inordinately expensive and difficult to control.

An object of the invention is to provide a simple and economical fluid pressure seal to seal effectively a clearance between relatively rotatable parts.

Another object of the invention is to provide a fluid pressure seal that maintains a light engagement between relatively rotatable parts at all times and that provides pressure staging to minimize leakage.

Further objects and advantages of the present invention will be apparent from the following description, reference being had to the accompanying drawings wherein a preferred form of the present invention is clearly shown.

In the drawings:

Fig. 3 is a fragmentary sectional view taken along the axis of an axial flow compressor of a turbojet engine illustrating another form of the invention, Fig. 4 is a fragmentary view, partially broken away, taken on the plane indicated by the line 4—4 of Fig. 3.

Figures 1, 2:
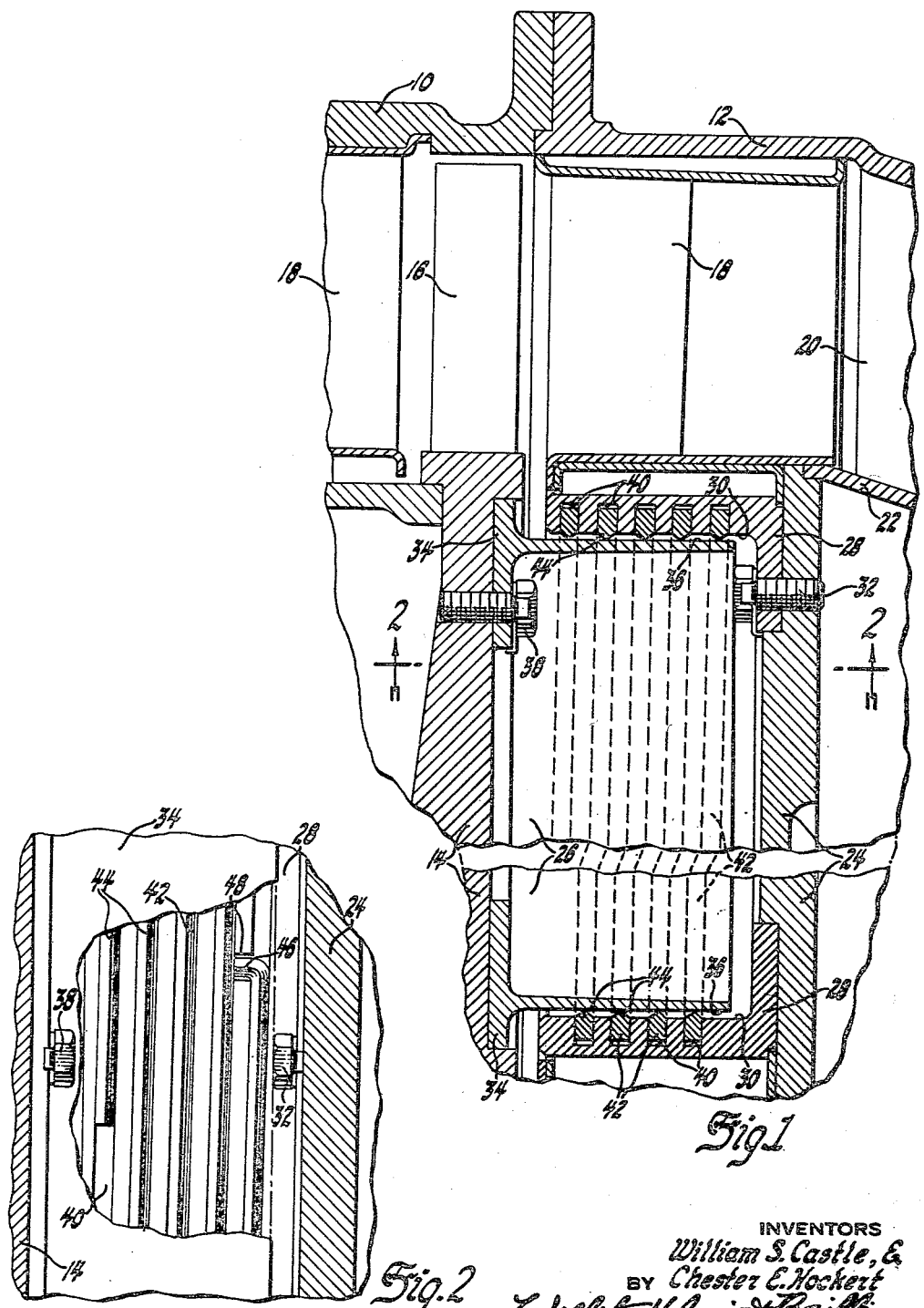
Fig. 1 is a fragmentary sectional view taken along the axis of an axial flow compressor of a turbojet engine illustrating one form of the invention.
Fig. 2 is a fragmentary view, partially broken away, taken on the plane indicated by the line 2—2 of Fig. 1.

Referring to the drawings, the invention is shown as a gas seal for the discharge end of the compressor rotor of a known type of turbojet engine, only so much of the engine being shown as is necessary for the understanding of the invention. The fluid pressure sealing arrangement is applied to the external surface of an annular sealing member on the compressor rotor in Figs. 1 and 2 and to the internal surface of the annular sealing member in Figs. 3 and 4. The compressor rotation is the same in both arrangements; namely, clockwise when viewed from the left-hand side of the drawings, and like elements in both arrangements are identically designated.

The circular cylindrical outer casing 10 of the turbojet compressor is suitably secured to the compressor outlet casing 12 which connects to the turbojet combustor. A semi-drum type axial flow compressor rotor 14 is suitably journaled for rotation in the outer casing in the usual manner. Annular rows of compressor rotor blading 16 and stator blading 18 force air under high pressure and velocity into the annular combustor intake 20 formed between the outer casing 12 and an inner casing 22 suitably fixed therein. A disk 24 at the forward end of the casing 22 supports the rear bearing (not shown) of the compressor rotor 14. The disk 24 forms an annular chamber 26 with the rearward face of the compressor rotor 14 which chamber is maintained near atmospheric pressure. The high pressure compressor discharge air would leak rapidly into the chamber 26 were it not for the gas sealing arrangement of the invention.

An annular flange 28 having a right circular cylindrical surface 30 is suitably secured to the fixed disk 24 by an annular row of bolts 32. An annular flange 34 having a surface 36 in concentric clearance relation with the surface 30 is suitably secured to the rotor 14 by an annular row of bolts 38. A thread-like rectangular-shaped helical groove 40 is formed in the surface 30 of the flange 28 to receive a helical spring or multiple coil 42 of substantially rectangular section. The parts described may be of any suitable composition possessing the desired physical characteristics such as alloys of magnesium, aluminum and steel. An important feature of the invention resides in resiliently engaging tthe rim portion 44 of the multiple coil 42 against the surface 36 of the rotor and the multiple coil 42 is preferably formed of springable material. The fit of the multiple coil 42 in the groove 40 is such that the coil is free to expand and contract in the groove. The coil is secured against rotation or threading in the groove only at one of its ends by a hooked-over portion 46 which is received in an axially directed slot 48 extending between adjacent turns of the groove 40.

In Figs. 1 and 2 the rotor surface 36 lies inside the multiple coil 42, and with clockwise rotation of the rotor as previously noted, a right-hand coil having a free internal diameter smaller than the diameter of the rotor surface 36 is utilized. The inherent resilience or elasticity of the multiple coil 42 resiliently engages it with the rotor surface 36. A wide range of engagement forces between the coil and rotor may be had by properly proportioning the free diameter of the coil to the rotor surface 36. The engagement force is preferably light so that undue frictional heating of the seal is avoided. Seizure between the coil and rotor is avoided because any momentary increase in frictional drag will loosen or unwind the coil from the rotor surface 36 to decrease the drag. The contact between the coil and rotor is thereby self-regulating and lubrication of the seal becomes unnecessary despite rotor speeds which may exceed 10,000 R. P. M. with coil diameters of over 2½ feet. The seal is intended for unidirectional rotor rotation only as reverse rotation would tighten the coil on the rotor and result in its destruction. A suitable soft bearing material such as brass or silver may be plated on either the rotor surface 36 or the contacting rim portion of the multiple coil 42 to reduce the frictional drag if desired. Pressure staging to reduce leakage flow is accomplished by providing a multiple coil, each coil acting somewhat similarly to an individual pair of pressure staging labyrinth rings.

In the arrangement shown in Figs. 3 and 4 the motor rotation is clockwise as previously noted but the rotor surface 36 is outside the multiple coil 42 in distinction to the arrangement shown in Figs. 1 and 2. A left-hand coil is utilized which has a free external diameter larger than the internal diameter of the rotor surface 36. Frictional drag increases, loosens or winds the coil from the rotor surface 36 to decrease the drag. If large diameter coils such as illustrated are utilized, it is vital that they be supported by the fixed member rather than the rotor to eliminate undesirable engagement forces which would result from centrifugal action were they supported by the rotor.

While the preferred embodiments of the invention have been described fully in order to explain the principles of the invention, it is to be understood that modifications in structure may be made by the exercise of skill in the art within the scope of the invention, which is not to be regarded as limited by the detailed description of the preferred embodiment.

We claim:

1. A high pressure, high temperature gas seal for turbomachines and the like, said seal being entirely fashioned from heat resistant metallic material and comprising a first member having a surface of revolution provided with a thread-like groove having parallel side walls forming a plurality of axially spaced turns, a second member rotatable relatively to said first member and having a surface of revolution in concentric spaced relationship with said surface of said first member, a coil spring having a plurality of axially spaced turns slidably received in said groove for radial and rotational movement and including a rim portion protruding from said surface of said first member and resiliently bearing against the surface of said second member to form a sliding contact labyrinth seal therewith, said groove having sufficient depth to provide a space between the bottom of said groove and that peripheral surface of said coil that is located in said groove, one end of said coil being secured to said first member to prevent said coil from rotating as an entirety with said second member, said second member being relatively rotatable in a direction such that increases in frictional drag between said coil turns and the surface of said second member tend to twist said coil turns from contact therewith.

2. A high pressure, high temperature gas seal for turbomachines and the like, said seal being entirely fashioned from heat resistant metallic material and comprising a first member having a surface of revolution provided with a helical groove, said groove having parallel side walls forming a plurality of axially spaced turns, a second member rotatable relatively to said first member and having a surface of revolution in concentric spaced relationship with said surface of said first member, a helical coil spring having a plurality of axially spaced turns with parallel sides slidably received between said groove walls for radial and rotational movement and including a rim portion protruding from said surface of said first member and resiliently bearing against the surface of said second member to form a sliding contact labyrinth seal therewith, said groove having sufficient depth to provide a space between the bottom of said groove and that peripheral surface of said coil that is located in said groove, one end of said coil being secured to said first member to prevent said coil from rotating as an entirety with said second member, said second member being relatively rotatable in a direction such that increases in frictional drag between said coil turns and the surface of said second member tend to twist said coil turns from contact therewith.

3. A high pressure, high temperature gas seal for turbomachines and the like, said seal being entirely fashioned from heat resistant metallic material and comprising a first member having a surface of revolution provided with a helical groove, said groove having parallel side walls forming a plurality of axially spaced turns, a second member rotatable relatively to said first member and having a surface of revolution in concentric inwardly spaced relationship with said surface of said first member, a helical coil spring having a plurality of axially spaced turns with parallel sides slidably received between said groove walls for radial and rotational movement and including a rim portion protruding from said surface of said first member and resiliently bearing against the surface of said second member to form a sliding contact labyrinth seal therewith, said groove having sufficient depth to provide a space between the bottom of said groove and that peripheral surface of said coil that is located in said groove, one end of said coil being secured to said first member to prevent said coil from rotating as an entirety with said second member, said second member being relatively rotatable in a direction such that increases in frictional drag between said coil turns and the surface of said second member tend to twist said coil turns from contact therewith.

4. A high pressure, high temperature gas seal for turbomachines and the like, said seal being entirely fashioned from heat resistant metallic material and comprising a first member having a surface of revolution provided with a helical groove, said groove having parallel side walls forming a plurality of axially spaced turns, a second member rotatable relatively to said first member and having a surface of revolution in concentric outwardly spaced relationship with said surface of said first member, a helical coil spring having a plurality of axially spaced turns with parallel sides slidably received between said groove walls for radial and rotational movement and including a rim portion protruding from said surface of said first member and resiliently bearing against the surface of said second member to form a sliding contact labyrinth seal therewith, said groove having sufficient depth to provide a space between the bottom of said groove and that peripheral surface of said coil that is located in said groove, one end of said coil being secured to said first member to prevent said coil from rotating as an entirety with said second member, said second member being relatively rotatable in a direction such that increases in frictional drag between said coil turns and the surface of said second member tend to twist said coil turns from contact therewith.

References Cited in the file of this patent

UNITED STATES PATENTS

| | | |
|---|---|---|
| 2,188,858 | Chievitz | Jan. 30, 1940 |
| 2,433,839 | Ferguson et al. | Jan. 6, 1948 |
| 2,444,874 | Hanson | July 6, 1948 |

FOREIGN PATENTS

| | | |
|---|---|---|
| 121,868 | Great Britain | Jan. 9, 1919 |
| 43,398 | Norway | Nov. 15, 1926 |